(12) United States Patent
Yin et al.

(10) Patent No.: US 11,698,849 B2
(45) Date of Patent: Jul. 11, 2023

(54) AUTOMATED APPLICATION TESTING OF MUTABLE INTERFACES

(71) Applicant: MICRO FOCUS LLC, Santa Clara, CA (US)

(72) Inventors: Peng-Ji Yin, Shanghai (CN); Xiao-Fei Yu, Shanghai (CN); Shuhui Fu, Shanghai (CN); Yi-Bin Guo, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/201,320

(22) Filed: Mar. 15, 2021

(65) Prior Publication Data
US 2022/0292011 A1 Sep. 15, 2022

(51) Int. Cl.
| | | |
|---|---|---|
| *G06F 11/36* | (2006.01) | |
| *G06T 7/11* | (2017.01) | |
| *G06F 3/0487* | (2013.01) | |
| *G06F 8/65* | (2018.01) | |
| *G06V 10/40* | (2022.01) | |
| *G06F 18/22* | (2023.01) | |

(52) U.S. Cl.
CPC ........ *G06F 11/3664* (2013.01); *G06F 3/0487* (2013.01); *G06F 8/65* (2013.01); *G06F 11/3688* (2013.01); *G06F 18/22* (2023.01); *G06T 7/11* (2017.01); *G06V 10/40* (2022.01); *G06T 2200/24* (2013.01)

(58) Field of Classification Search
CPC ...... G06F 11/3664; G06F 3/0487; G06F 8/65; G06F 11/3688; G06T 7/11; G06T 2200/24; G06V 10/40; G06K 9/6215

USPC ......................................................... 717/125
See application file for complete search history.

(56) References Cited

U.S. PATENT DOCUMENTS

| | | | | |
|---|---|---|---|---|
| 2011/0216935 | A1* | 9/2011 | Mays | G01C 21/00 382/218 |
| 2012/0243745 | A1* | 9/2012 | Amintafreshi | G06F 11/3692 382/103 |

(Continued)

OTHER PUBLICATIONS

Mesbah et al, "Invariant-Based Automatic Testing of AJAX User Interfaces", 2009, [Online], pp. 210-220, [Retrieved from interneton Feb. 13, 2023], <https://ieeexplore.ieee.org/stamp/stamp.jsp?arnumber=5070522> (Year: 2009).*

(Continued)

*Primary Examiner* — Anibal Rivera
*Assistant Examiner* — Zengpu Wei
(74) *Attorney, Agent, or Firm* — Sheridan Ross P.C.

(57) ABSTRACT

Applications under test (AUT) may be tested by automated testing systems utilizing machine vision to recognize visual elements presented by the AUT and apply inputs to graphical elements, just as a human would. By utilizing the smallest image patch available, processing demands of the testing system are minimized. However, the image patch used to identify a portion of an AUT must be identifiable to the automated system. By selecting image patches that comprise the smallest size, but can be identified in an AUT by an automated system using machine vision, even as the AUT display is resized, reproportioned, noisy, or otherwise altered from the testing platform that was utilized for training.

20 Claims, 5 Drawing Sheets

(56) References Cited

U.S. PATENT DOCUMENTS

| | | | |
|---|---|---|---|
| 2014/0366005 A1* | 12/2014 | Kozhuharov | G06F 11/3696 |
| | | | 717/125 |
| 2015/0103092 A1* | 4/2015 | Khambanonda | G06F 40/106 |
| | | | 345/593 |
| 2015/0347284 A1* | 12/2015 | Hey | G06F 11/3692 |
| | | | 717/125 |
| 2016/0092727 A1* | 3/2016 | Ren | G06V 10/462 |
| | | | 382/103 |
| 2017/0235661 A1* | 8/2017 | Liu | G06F 8/443 |
| | | | 717/106 |
| 2018/0260946 A1* | 9/2018 | Fan Jiang | G06T 7/74 |
| 2019/0147026 A1* | 5/2019 | Jon | G06F 3/04883 |
| | | | 715/230 |
| 2019/0340669 A1* | 11/2019 | Sugaya | G06Q 30/06 |

OTHER PUBLICATIONS

Deepanshu Tyagi, "Introduction to Feature Detection and Matching", Data Breach, Jan. 3, 2019, 8 pages.
Deepanshu Tyagi, "Introduction to SIFT (Scale Invariant Feature Transform)," Data Breach, Mar. 16, 2019, 10 pages.
Richard Szeliski, "Computer Vision: Algorithms and Applications" Sep. 3, 2010.

* cited by examiner

AUTOMATED APPLICATION TESTING OF MUTABLE INTERFACES

FIELD OF THE DISCLOSURE

The present disclosure is generally directed toward automated testing and more specifically to automated testing of applications comprising a user interface.

BACKGROUND

Automated testing of software applications allows software developers to test applications for faults that may result from erroneous or unexpected input or code that then produces extraneous results from one or more user inputs. By automating testing, software may be scrutinized consistently, such as to repeatedly perform a set of tests that may be complex, tedious, or otherwise difficult for human testers to perform reliably. Additionally, development platforms and execution platforms may be dissimilar. For example, software may be developed on personal computers or other desktop workstations whereas the intended execution platform may be a mobile phone or computer with a different operating system. Additionally, differences in operating systems, screen sizes, input devices utilized, or other differences between platforms may further provide an opportunity for undiscovered errors or unintended behaviors to exist on one platform even when the development platform, utilizing the same inputs, fails to produce the erroneous behavior.

Software testing originated with human-performed instructions, often with the aid of printed instructions. While such techniques may still be used today, they are impractical for all but the simplest applications or to test a limited feature of a more complex application. Automated testing evolved to include test-specific compiled or interpreted source code, such that testing features were integrated as "hooks" into an executable generated for testing. These systems allowed source code, such as the human-readable labels provided to identify graphical elements or variables, to be cataloged and selected programmatically. For example, a particular button on a particular page may identified by the label provided by the programmer and an automated testing script developed that causes an input to be applied to the button. However, such systems are resource intensive and require access and knowledge of the source code, which may need to be complied on a number of systems with different operating systems or other attributes.

More recently, test systems were developed to capture the actions of a human performing a test on a particular application. Automated systems would then replay the human actions during subsequent tests. While automated testing platforms continue to evolve, the complexities of testing applications often exceed the capabilities of automated testing systems of the prior art.

SUMMARY

Automated test systems may rely on visual features of an application under test (AUT). Utilizing machine vision, a test may be performed wherein the system visually looks for features and input locations on the AUT similar to what a human user would do. For example, if a user wanted to click on a particular graphical feature, the visual feature is identified and a pointing device or other selection input device is utilized to then click on the graphical feature. Machine vision allows for the testing of applications similarly. However, if the testing system looks for too large of an area, such as the majority of a window, the processing demands can be significantly higher, than if only a small portion of the screen is selected. The downside to selecting a small portion of the display is that it may not be found. This can be particularly true when the screen used for automated testing is of a different size than the system utilized for training the testing system. For example, a region of a display may comprise two buttons with markings placed side-by-side, however, if the test is performed on a different screen, such as one where the two buttons are now on top of each other, the recognition system may fail to find the target.

Automated testing systems can partially or completely remove humans from the process of testing software applications. The AUT may have a very large number of combinations of inputs where a first input may determine a set of subsequent inputs that would not be available if the first input were different. The number of permutations can become very large and impractical for a human to perform such tests consistently. Additionally, a change to the AUT may require testing of the change as well as regression testing to ensure the change did not adversely affect any other portions of the applications. Automated testing systems may be readily modified to reflect such changes and then execute tests on the new feature and/or perform the regression testing, without requiring changes to unaltered portions of the AUT.

Tests may include exhaustively testing every permutation of options, perform a sampling of options selected by the testing system, or other subset of all potential tests to provide an absolute or sufficiently significant evidence that the AUT is (or is not) performing as expected. If an abnormality is detected, the automated testing system can log the operations that produced the abnormality and stop the test. Alternatively, testing may continue to perform other tests on the AUT. In contrast to automated testing systems, human testers are slower and may introduce inconsistencies and expected inputs.

As provided in the embodiments herein, once a human performed a test with an automated system observing and recording the human-provided inputs and the target of those inputs, the testing system may perform the tests as observed or, optionally, with certain modifications. Such modifications may be constrained in whole or in part by parameters programmed into the testing system to allow test to include a greater variety of tests without requiring human inputs to define each of the tests. For example, an address field may include a country of residence selection option. The resulting selection of a country may then present more detailed address fields that are specific to the selected country, such as province, state, prefecture, region, city, etc. and/or acceptable address formats for the selected country.

A human user may be observed by the testing system to select a particular country. In response, the subsequent address fields are populated with information consistent with the selected country. An automated testing system may perform the same test and/or select different countries, such as by exhaustively testing each country or by executing instructions to select different countries. The testing system may access data regarding the selected country, such as address format rules or other options, and provides the resulting address fields presented for that country with appropriate address information consistent with the test. The testing system may intentionally enter erroneous information to determine if the AUT can respond appropriately, such as to identify the error or solicit an input of the correct information. It should also be appreciated that automated testing systems may periodically or randomly execute an alteration of the input provided to vary the input from the inputs as observed during by the human-performed testing. This may be to provide a greater variety of tested inputs and/or to test intentionally erroneous inputs.

When a testing system is observing a human's input, such as a particular location of a screen pointer when a mouse-click was observed, determining the target of such an input can be critically important. Visually, the human may provide the input to a particular graphical element on a graphical user interface (GUI). For example, the human user may have selected a particular option by mouse-clicking on a graphical button. Visually, and without access to the source code, the automated system observes the location on the screen relative to other graphical elements as the target of the input.

While the particular X, Y coordinates of the pointer on the screen or within a window may be readily determined, an automated testing system may not be able to utilize such coordinates during a subsequent automated test on systems utilizing different display parameters. For example, automated testing may be performed on a device with a different screen size or resolution from the test that the human utilized during recorded actions of the prior test. As a result, a subsequent automated test on a different device may make using the observed X, Y coordinates erroneous or, at least, unreliable across systems.

It is with respect to the above issues and other problems that the embodiments presented herein were contemplated. In one embodiment, a determination of a particular image patch to record for use when comparing with the AUT during replay is provided herein. The image patch selected is then determined relative to the AUT, and the system executing the AUT, to apply a consistent input even as one or more of the resolution, scaling screen size, proportions, etc., of the screen presenting the AUT may differ from the AUT as presented by the device utilized during recording of the human interactions.

Recording the human interaction may be provided by software, such as a screen capturing application, hardware, such as a signal capturing device, or a combination of hardware and software. In one embodiment, the image of an AUT is captured before a user interaction and a second image captured after the user interaction, the difference then being the result of the user interaction. For example, a mouse "hover" over a target may cause the target to be highlighted. The image of the AUT before (not highlighted) and after (highlighted) being the result of the hover operation. An input may similarly result in a graphical element(s) (e.g., window, dialog, character, checked checkbox, selected radio button, new screen, etc.) appearing, disappearing, being altered (e.g., hidden or grayed-out when deactivated, shown; normalized—not grayed-out—when activated; moved; altered size, color, font; etc.), or a combination thereof. The specific target of the interaction is identified visually.

Prior art systems may compare the image before the input and after the input to determine the target of the input. This technique may work well as long as the result of the input is observed in the same area different from the target of the input, for example, selecting a graphical element that becomes highlighted once selected. Other techniques may use edge detection, such as to determine the location of the pointer and the portion of the AUT that extends to an edge, such as may be detected by Canny Edge detector or similar edge detection technique. For example, the pixel at the point of a pointer may be expanded outward in all directions, as long as the next pixel is matches—or is within a previously determined range of variations—from the previous pixel. If the next pixel is different or sufficiently different, such as the result of the next pixel being a different color, hue, contrast etc., to indicate the edge of a graphical element, then an edge may be detected and the interior of the edge identified as the target. However, such techniques are not always suitable. Scaling for a particular device display or window or differences in color, such as may result in remote access via VNC, Citrix, or other remote-access application, may make such techniques error prone or fail altogether.

In one embodiment, a scale-invariant feature transform (SIFT) algorithm is utilized to detect sufficient feature points on the recorded image patch for use in subsequent replay during automated tests. Feature points may comprise image features—points, edges, objects, or other certain properties previously or dynamically identified, and/or image keypoints—distinctive image features that can be detected in an image even as the image differs from a reference image in terms of image scale or resolution, illumination and noise, and image orientation and perspective. As an extreme example, a feature point could be a single pixel, if the pixel was unique within a window presented by an application. Otherwise, feature points are combinations of pixels that, as a combination, are uniquely identifiable by the machine vision system observing the human or performing the automated testing of an AUT. Feature points may be unique to the AUT, unique to a particular window or screen of the AUT, or comprise a collection of feature points that are unique. The particular image features and the use of SIFT are described in greater detail in, "Introduction to Feature Detection and Matching" by Deepanshu Tyagi, version dated Jan. 3, 2019 and available at medium.com/data-breach/introduction-to-feature-detection-and-matching-65e27179885d which is incorporated herein by reference in its entirety, including linked subsections, and for all that it teaches, in particular the subsection entitled, "Introduction to SIFT (Scale Invariant Feature Transform (SIFT)," directly accessible at medium.com/data-breach/introduction-to-sift-scale-invariant-feature-transform-65d7f3a72d40, version dated Mar. 16, 2019. Reference is also made to, "Computer Vision: Algorithms and Applications" by Richard Szeliski dated Sep. 3, 2010, and available at szeliski.org/Book/drafts/SzeliskiBook_20100903_draft.pdf, particularly but not limited to Chapter 4 (see Id. p. 205), and is also incorporated herein by reference in its entirety and for all that it teaches.

While advantages may be realized by utilizing SIFT, manually sizing of the image patch to capture a sufficient number of feature points is time consuming and error prone. As a result, users may be tempted to make the image patch overly large, resulting in a significant increase in processing demands as unnecessary features are included in the image patch and utilized for subsequent processing. However, and in another embodiment, automatically identifying a sufficient number of feature points for a reliably usable image patch is provided herein.

In one embodiment, an initial boundary of interest is identified. This may be the limits of a graphical element that is subject to an input operation. The number of feature points within this initial area is identified. If a threshold number of feature points is not identified, then processing continues, otherwise the initial boundary of interest is identified. Additionally or alternatively, too many feature points may be initially selected and processing continues to reduce the number of feature points within image patch to below a determined maximum number.

If more feature points are needed to reach a previously determined or dynamically determined threshold, then the boundary is expanded in one or more directions. This may extend beyond a particular graphical element (e.g., button, softkey, etc.) to include additional feature points. The image patch currently selected is compared to the AUT image captured during recording. The AUT image is zoomed in and out in one or two dimensions, which may comprise preset values and/or a continuous scaling between a maximum and minimum value and compared to the image patch currently selected to determine if the feature points are usable for all, or a predefined subset of scales of the AUT image. If the image of interest in the AUT cannot be identified, the image patch of the currently selected image is adjusted at previously defined increment and the process restarted. If the image of interest is identified, then the image patch of the currently selected image is utilized during recording of the human interaction to train the automated system during replay. As a benefit of the embodiments provided herein, a user does not manually adjust the image patch boundaries, which often comprises guesswork or trial-and-error, to identify the smallest boundary for the image patch that has a sufficient number of feature points that is usable on a scaled AUT during automated testing.

In one embodiment, an application testing system is disclosed, comprising: a data storage; a processor comprising at least one microprocessor executing an application under test (AUT); wherein the processor: captures a first image of the AUT; selects an image patch, wherein the image patch is a portion of the first image; identifies a number of feature points within the image patch; and extends a boundary of the image patch to add additional feature points to the number of feature points until the number of feature points satisfy a previously determined threshold number of feature points; and causes the image patch to be stored in a record maintained in a data storage.

In another embodiment, a method of application testing is disclosed, comprising: capturing a first image of an application under test (AUT); selecting an image patch, wherein the image patch is a portion of the first image; identifying a number of feature points within the image patch; and extending a boundary of the image patch to add additional feature points to the number of feature points until the number of feature points satisfy a previously determined threshold number of feature points; and storing the image patch in a record maintained in a data storage.

In another embodiment, an application testing system is disclosed, comprising: means to capture a first image of an application under test (AUT); means to select an image patch, wherein the image patch is a portion of the first image; means to identify a number of feature points within the image patch; and means to extend a boundary of the image patch to the number of feature points until the number of feature points satisfy a previously determined threshold number of feature points; and means to store the image patch in a record maintained in a data storage.

In other embodiments, a system on a chip (SoC) including any one or more of the above embodiments and/or one or more means for performing any one or more of the above embodiments. Additionally or alternatively, any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a microprocessor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known to as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
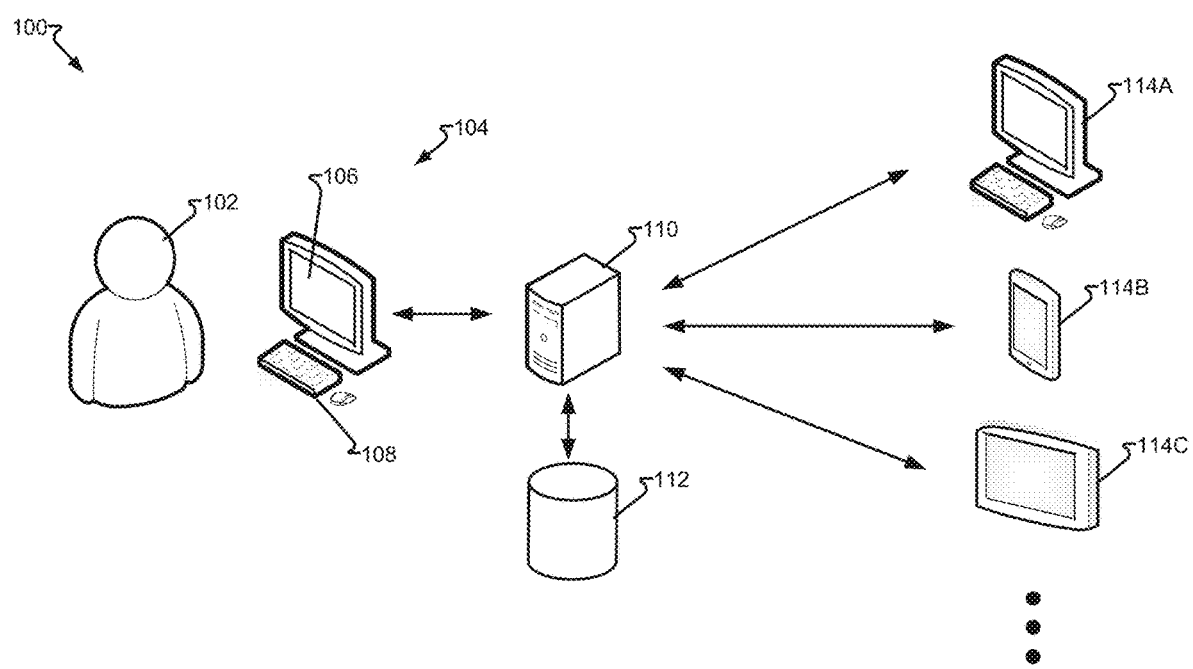
FIG. 1 depicts a first system in accordance with embodiments of the present disclosure.

FIG. 1 depicts system 100 in accordance with embodiments of the present disclosure. In one embodiment, user 102 utilizes computer system 104 to train a testing system, such as computer server 110. It should be appreciated by those of ordinary skill in the art that the topology illustrated may be varied without departing from the scope of the embodiments herein. For example, a microprocessor (or, more simply, processor) may execute the application under test (AUT) on computer system 104. While user 102 receives visual content from the AUT on display 106 and provides inputs on input device 108 (e.g., mouse, keypad, touchscreen, touchpad, etc.). Optionally, computer system 104 may comprise additional input and output devices or other peripherals. While conducting the test, a processor, such as at least one processor of server 110 may execute a testing application, such as to determine the contents presented by display 106 and how those contents change in response to inputs on input device 108. However, in other embodiments, both the AUT and the testing application may be executing on the same device, such as computer system 104 with data stored in data storage device 112, which may be embodied as one or more non-transitory devices external to display 106 and/or server 110 or integrated within. Data storage device 112 may maintain data, such as testing data and/or instructions for at least one of the processors to execute the AUT and/or testing application.

The testing application utilizes, in part, machine vision to identify portions of the AUT that received an input from user 102 via input device 108 and to generate an input to the same portion of the AUT when executing on test platform 114A-C. It should be appreciated that test platforms 114 are illustrated as comprising test platform 114A-C, but may comprise any number of similar or dissimilar test devices. Accordingly, test platform 114A-n, wherein 'n' is any whole number greater than zero, are contemplated. For example, test platform 114A may comprise a desktop computer, test platform 114B may comprise a smartphone, test platform 114C may comprise a tablet computer, and/or other devices comprising a processor, display, and any other hardware and software required to execute the AUT. Variations in test platform 114 may be substantial, such as a mainframe computer versus a smartwatch, or minor, such as identical hardware executing different versions of the same operating system. While differences from one test platform 114 to another may be physical, the same hardware may be utilized when configured differently. Tests may also be performed on identical, or even the same, test platform 114 such as to confirm results or apply a change to the AUT, testing software, and/or other component or configuration. In one example, the resolution of display 106 may differ from computer system 104 and when testing on one or more of test platform 114. The difference may be due to conservation of bandwidth, such as during a remote collaboration session wherein test platform 114 is a remote device executing the AUT. Additionally or alternatively, the display of one or more of test platform 114 may be the result of different resolution, proportions, color limitations (e.g., number of colors, hues, etc.), which may be native to the device or the result of a particular configuration.

Figure 2:
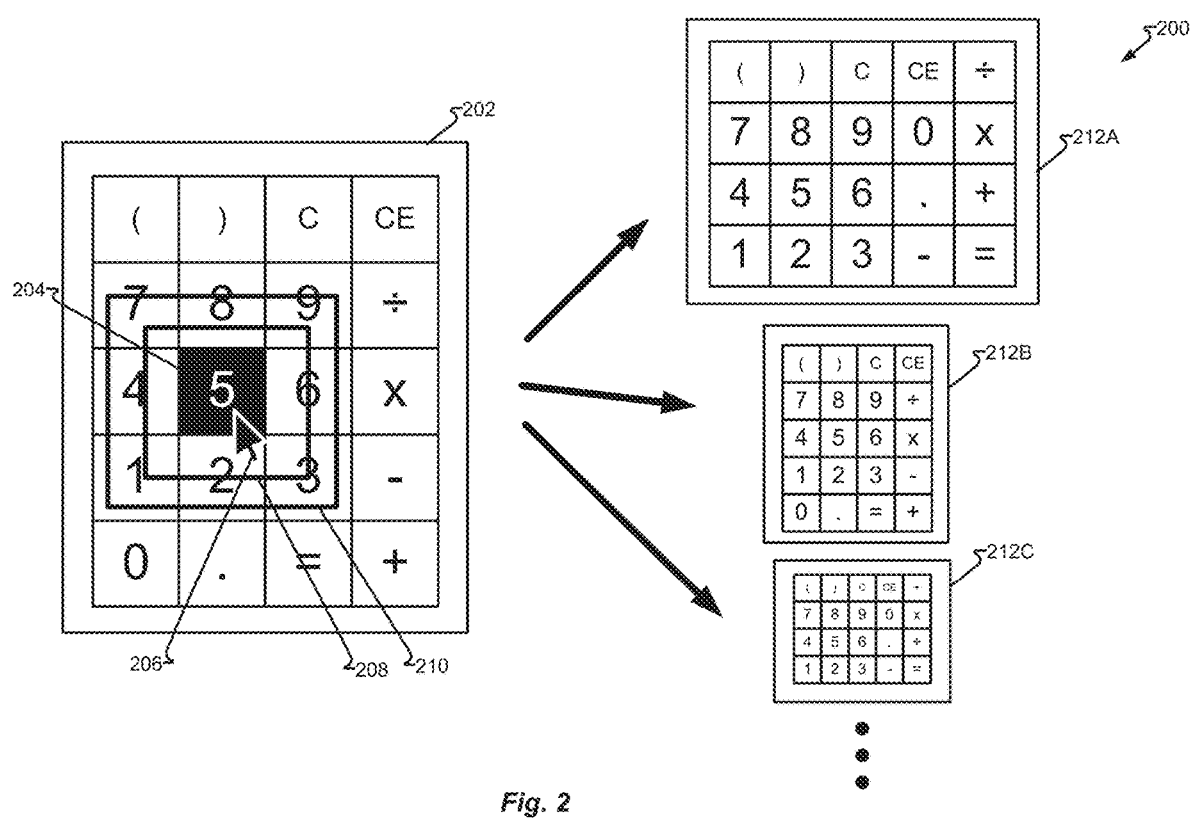
FIG. 2 depicts a first determination of an image patch in accordance with embodiments of the present disclosure.

FIG. 2 depicts a determination 200 of image patch 210 in accordance with embodiments of the present disclosure. In one embodiment, application under test 202 is being tested comprising inputs from user 102, such as to determine the position of pointer 206 while a mouse click is received on input device 108. The testing application may determine that target graphical element 204 was the recipient of the input, such as by the change in colors of target graphical element 204 and/or the position of pointer 206 when a click event was intercepted by the testing application. The location of pointer 206 may be relative to display 106, relative to a window presenting application under test 202, and/or to a particular graphical element of application under test 202.

A processor of computer system 104 may initially select candidate image patch 208 and determine if there are sufficient feature points within. A feature point may be an image feature, wherein the image comprises a point, edge, or other geometry that is identified despite mutations of the display, such as due to rotation and/or scaling. Additionally or alternatively the image feature may be identifiable with the insertion of image noise and/or alternate illumination aspects. Image features may be compared to a number of image attributes for the AUT, such as may be maintained in data storage device 112. When an object has sufficient image features, it may be utilized by the automated test system as the image patch. If a single image feature is identifiable across variations in scale, rotation, noise, etc., then the single image feature is identified as an image keypoint and may alone be sufficient to identify the location of the interaction, otherwise a number of image features may be required to sufficiently identify the location of the interaction.

In one embodiment, server 110 executing a test application may initially select the object that received the interaction, such as a mouse click, that is uniform to the extent of a boundary of the object, such as target graphical element 204. However, target graphical element 204 may not be visually unique, that is, absent sufficient image features, within the boarder thereof. Accordingly, the boundary in one or more directions is expanded, such as to candidate image patch 208. Here to, the test application may determine if sufficient image features are present and, if not, expand the boundary again in one or more directions to reach image patch 210 having sufficient image features therein.

In another embodiment, the extent of the boundary that determines image patch 210 may be discovered by server 110 executing the AUT at a variety of variations on the same or different device. For example, application under test 202 may be scaled and tested as application under test 212A-C, which may comprise different scale. Additionally or alternatively, if the AUT reconfigures the placement of visual elements of the AUT due to scaling, such as application under test 212B having a different scale and, as a result, an alternate configuration of elements. As the testing application is aware of the target location, such as by intercepting mouse click signals and the position of pointer 206, image patch 210 may be applied to one or more application under test 212 having a different scale, and optionally, configuration of elements and a determination made by the visual recognition portion of the testing application to determine if the image patch 210 can be successfully identified in application under test 212.

If image patch 210 is not successfully identified, then the boundary of image patch 210 may be expanded to include more image features and retested. Additionally or alternatively, if the image patch 210 is identified, a lower resolution image (e.g., application under test 212B, application under test 212C) may be tested to determine if the image patch can be identified therein and, if so, the boundary of image patch 210 reduced to include fewer image features.

Figure 3:
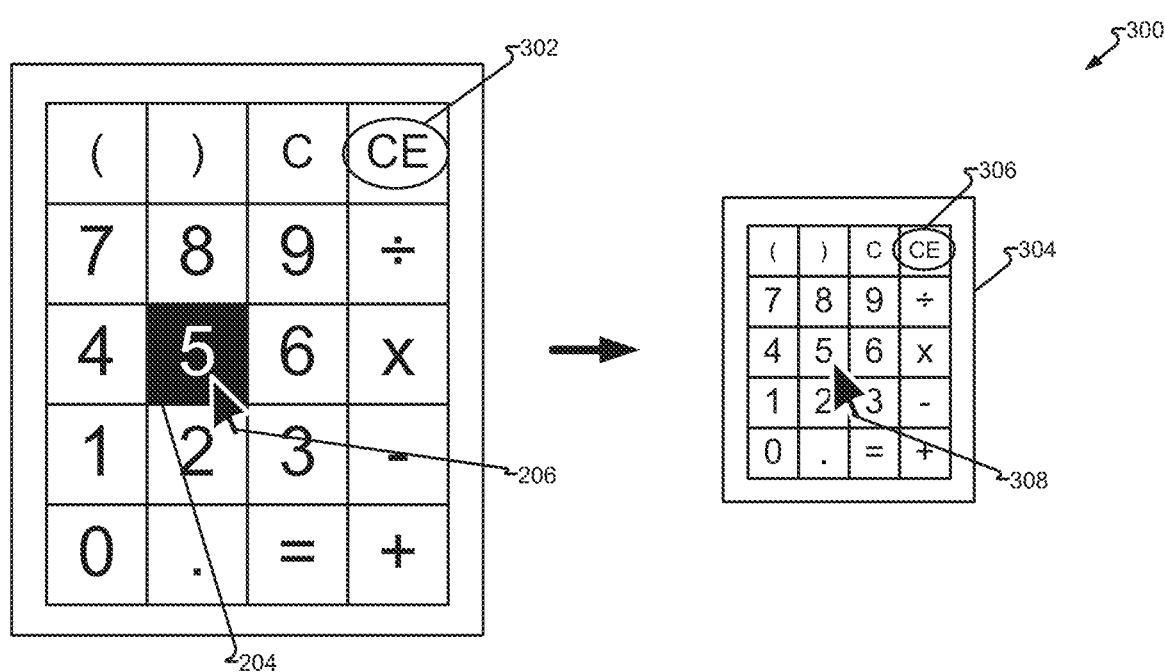
FIG. 3 depicts a second determination of an image patch in accordance with embodiments of the present disclosure.

FIG. 3 depicts determination 300 of an image patch 210 in accordance with embodiments of the present disclosure. In one embodiment, region 302 is determined to be an image keypoint. Accordingly, the location of pointer 206 may be identified at target graphical element 204 when it is at a certain position relative to region 302.

Similarly, application under test 304 may be executed on server 110 and determined if region 306 can be identified and, if so, a generated operation, such as the placement of pointer 308 and/or application of a mouse click of pointer 308 may be applied accurate to the same relative position within application under test 304. Scaling calculations be utilized to determine distances and/or direction from region 306 for the scale of application under test 304.

Figure 4:
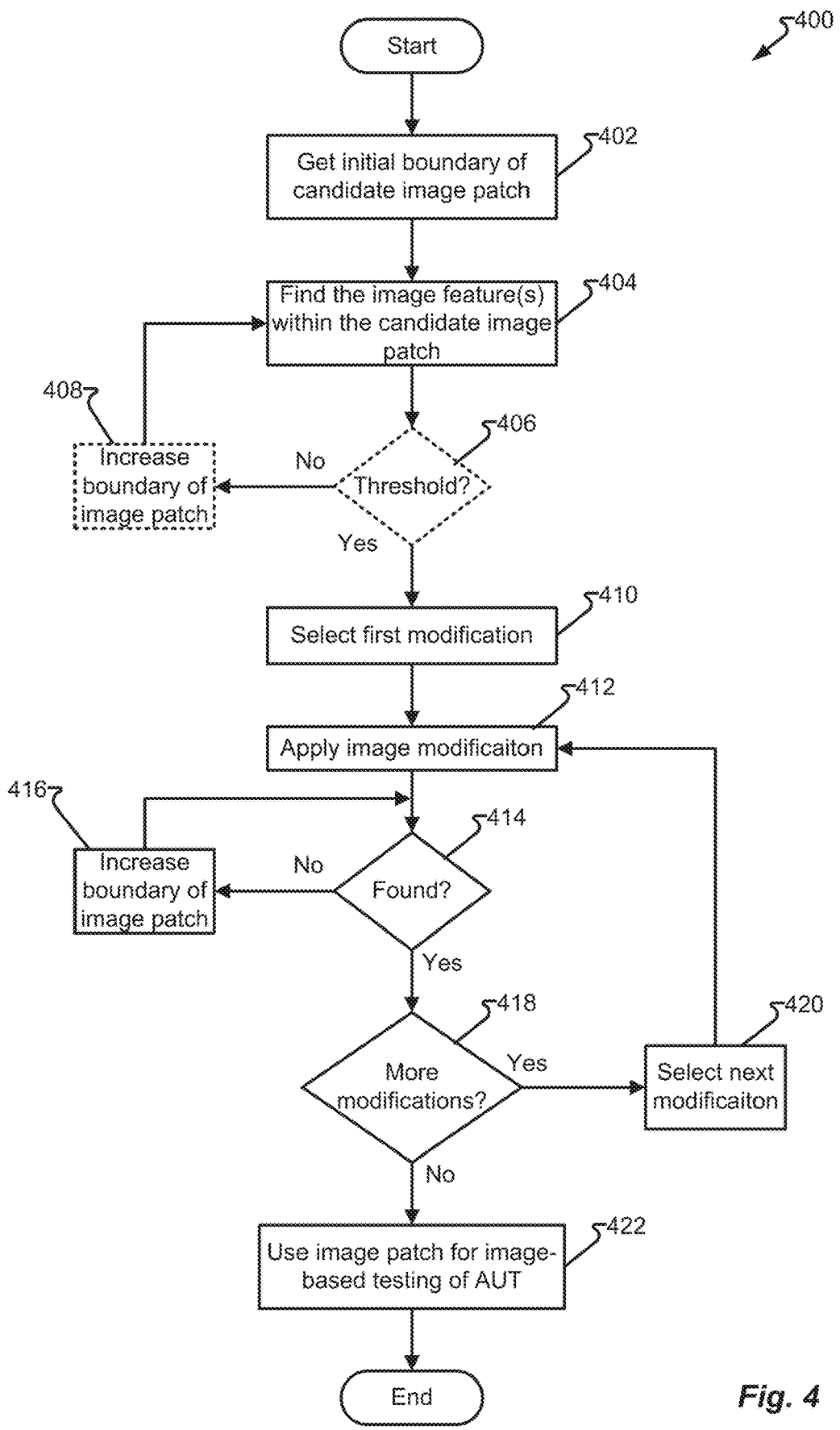
FIG. 4 depicts a process in accordance with embodiments of the present disclosure.

FIG. 4 depicts process 400 in accordance with embodiments of the present disclosure. In one embodiment, process 400 is embodied as machine-readable instructions maintained in a non-transitory memory that, when read by a processor such as a processor of computer system 104 and/or server 110, cause the processor to perform the steps thereof. Process 400 begins and, in step 402 an initial boundary of a candidate image patch is selected. Step 402 may utilize the edges of a graphical element, a certain number of pixels or distance from the center of a pointer, a portion of an AUT that changed as the result of an input etc. Step 404 then finds image features within the candidate image patch. Optionally, test 406 may determine if the number of features is greater than a previously determined threshold and, if determined in the negative, step 408 increases the boundary of the image patch in at least one direction. Processing then loops back to step 404.

If test 406 is determined in the affirmative, or if test 406 is omitted, processing continues to step 410 wherein a first modification is selected for the AUT. Step 410 is variously embodied and may include one or more of changing (increasing or decreasing) screen resolution, changing screen proportions, adding noise, changing color values (e.g., number of colors, hue, pallet, etc.). Then, in step 412 the modifications are applied wherein test 414 determines if the candidate image patch is successfully located when presented in the AUT with the modification from step 410. If test 414 is determined in the negative, processing continues to step 416 wherein the boundary of the candidate is increased and then loops back to test 414.

Once test 414 has identified the image patch as presented by the AUT having the modification, test 418 determines if any more (alternate or additional) modifications are to be performed and, if determined in the affirmative, processing continues to step 420 wherein the next modification is selected and processing loops to step 412. Once test 418 is determined in the negative, processing proceeds to step 422 wherein the image patch, having dimensions determined by the current boundary of the candidate image patch, is utilized. As a result, visual testing of the AUT on actual or simulated alternative devices that may alter the presentation of the AUT may be performed wherein identified graphical elements, as modified by different display settings or attributes, may be tested.

Figure 5:
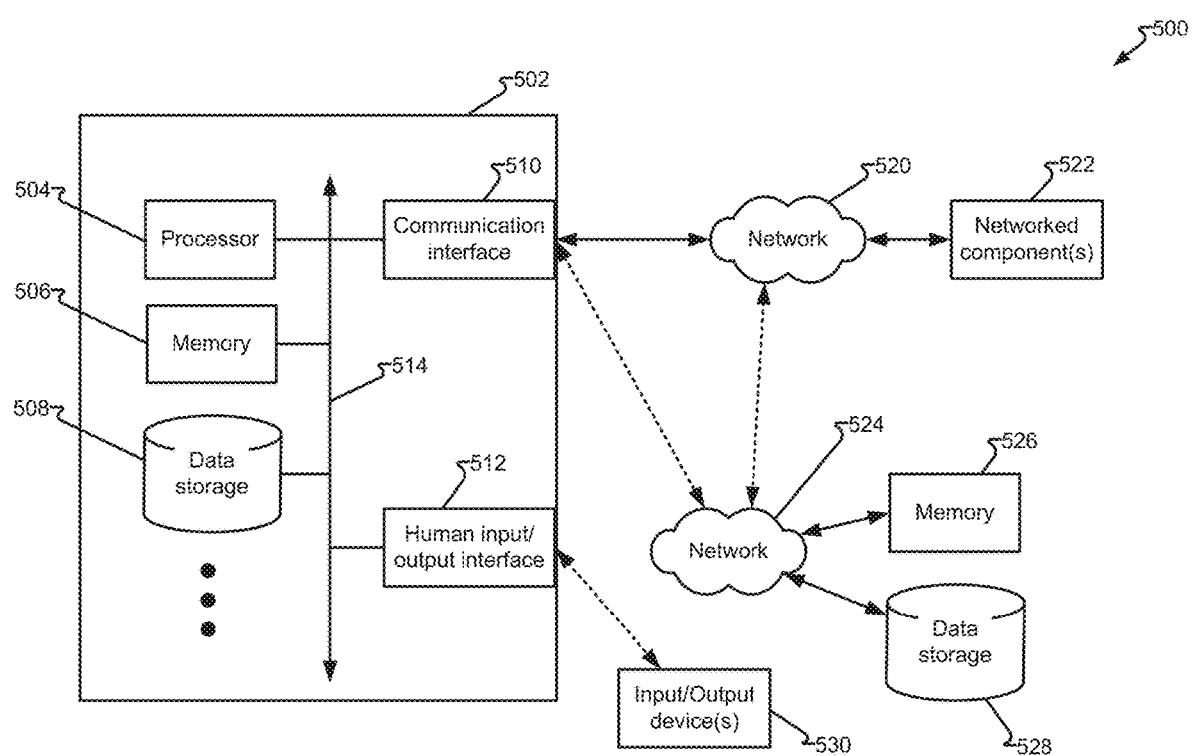
FIG. 5 depicts a second system in accordance with embodiments of the present disclosure.

FIG. 5 depicts device 502 in system 500 in accordance with embodiments of the present disclosure. In one embodiment, computer system 104 and/or server 110 may be embodied, in whole or in part, as device 502 comprising various components and connections to other components and/or systems. Additionally or alternatively, data storage device 112 may be embodied as any one or more of data storage 508, memory 506, data storage 528, and/or memory 526. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or utilize one or more networks, such as network 520 and/or network 524.

Components, such as computer system 104, server 110, data storage device 112, and/or test platform 114A-C may be interconnected via a network. The network may be embodied, in whole or in part, as network 520. Network 520 may be a wired network (e.g., Ethernet), wireless (e.g., WiFi, Bluetooth, cellular, etc.) network, or combination thereof and enable device 502 to communicate with network component(s) 522. In other embodiments, network 520 may be embodied, in whole or in part, as a telephony network (e.g., public switched telephone network (PSTN), private branch exchange (PBX), cellular telephony network, etc.)

Additionally or alternatively, one or more other networks may be utilized. For example, network 524 may represent a second network, which may facilitate communication with components utilized by device 502.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and allow device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. An application testing system, comprising:
a data storage;
a processor comprising at least one microprocessor executing an application under test (AUT); and
wherein the processor:
captures a first image of the AUT;
selects an image patch, wherein the image patch is a portion of the first image;
visually identifies a number of feature points within the image patch;
extends a boundary of the image patch, to an extended boundary, to add additional feature points to the number of feature points until the number of feature points satisfy a previously determined threshold number of feature points; and causes the image patch to be stored in a record maintained in the data storage.

2. The application testing system of claim 1, wherein the processor determines an extent of the extended boundary of the image patch comprising, executing a Scale Invariant Feature Transform (SIFT) algorithm provided with the first image and obtaining therefrom a size of the extended boundary of the image patch.

3. The application testing system of claim 1, further comprising:
an input device receiving a user input and converting the user input into an input signal wherein the input signal is provided as an input to the AUT; and
wherein the processor further identifies an input target of the input to the AUT as a location of the input to the AUT relative to the image patch.

4. The application testing system of claim 3, wherein:
the processor further comprises at least one microprocessor executing an automated test of the AUT; and
the processor, in performing the automated test of the AUT:
accesses the image patch and the input target from the record;
captures a second image of the AUT;
evaluates the second image of the AUT to determine if a match is present between the image patch and a portion of the second image; and
upon determining the match is present between the image patch and the portion of the second image, provides an automated input to the AUT at the location determined as a translated location of the input target on the image patch to an input location on the portion of the second image.

5. The application testing system of claim 4, wherein the first image of the AUT differs from the second image of the AUT in at least one of scale, illumination, noise, orientation, or perspective.

6. The application testing system of claim 4, wherein the match is determined upon determining at least a threshold number of image features of the image patch match image features of the portion of the second image.

7. The application testing system of claim 4, wherein the match is determined upon determining that at least a threshold number of image keypoints of the image patch match image keypoints of the portion of the second image.

8. The application testing system of claim 4, wherein the image patch comprises a plurality of noncontiguous image patches and the match is present when the portion of the second image matches one of the plurality of noncontiguous image patches.

9. The application testing system of claim 1, wherein the processor reduces the extended boundary of the image patch, in at least one but less than all directions, upon determining that the reduction of the extended boundary maintains the number of feature points.

10. A method of application testing, comprising:
capturing a first image of an application under test (AUT);
selecting an image patch, wherein the image patch is a portion of the first image;
visually identifying a number of feature points within the image patch;
extending a boundary of the image patch, to an extended boundary, to add additional feature points to the number of feature points until the number of feature points satisfy a previously determined threshold number of feature points; and storing the image patch in a record maintained in a data storage.

11. The method of application testing of claim 10, wherein determining an extent of the extended boundary of the image patch, further comprises executing a Scale Invariant Feature Transform (SIFT) algorithm provided with the first image and obtaining therefrom a size of the extended boundary of the image patch.

12. The method of application testing of claim 10, further comprising:
receiving a user input to an input device and converting the user input into an input signal wherein the input signal is provided as an input to the AUT; and
identifying an input target of the input to the AUT as a location of the input to the AUT relative to the image patch.

13. The method of application testing of claim 12, further comprising:
executing an automated test of the AUT, comprising a processor performing:
accessing the image patch and the input target from the record;
capturing a second image of the AUT;
evaluating the second image of the AUT to determine if a match is present between the image patch and a portion of the second image; and
upon determining the match is present between the image patch and the portion of the second image, providing an automated input to the AUT at the location determined as a translated location of the input target on the image patch to an input location on the portion of the second image.

14. The method of application testing of claim 13, wherein the first image of the AUT differs from the second image of the AUT in at least one of scale, illumination, noise, orientation, or perspective.

15. The method of application testing of claim 13, wherein the match is determined upon determining at least a threshold number of image features of the image patch match image features of the portion of the second image.

16. The method of application testing of claim 13, wherein the match is determined upon determining at least a threshold number of image keypoints of the image patch matching image keypoints of the portion of the second image.

17. The method of application testing of claim 13, wherein the image patch comprises a plurality of noncontiguous image patches and the match is present when the portion of the second image matches one of the plurality of noncontiguous image patches.

18. The method of application testing of claim 10, further comprising reducing the extended boundary of the image patch, in at least one but less than all directions, upon determining that the reduction of the extended boundary maintains the number of feature points.

19. An application testing system, comprising:
means to capture a first image of an application under test (AUT);
means to select an image patch, wherein the image patch is a portion of the first image;
means to visually identify a number of feature points within the image patch;
means to extend a boundary of the image patch, to an extended boundary, to the number of feature points until the number of feature points satisfy a previously determined threshold number of feature points; and means to store the image patch in a record maintained in a data storage.

20. The application testing system of claim 19, further comprising means to execute a Scale Invariant Feature Transform (SIFT) algorithm provided with the first image and obtaining therefrom a size of the extended boundary of the image patch.

\* \* \* \* \*